United States Patent
Hoppermann

(10) Patent No.: US 6,866,326 B2
(45) Date of Patent: Mar. 15, 2005

(54) LOWERABLE MOTOR VEHICLE ROOF

(75) Inventor: Andreas Hoppermann, Aachen (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/658,540

(22) Filed: Sep. 10, 2003

(65) Prior Publication Data

US 2004/0113454 A1 Jun. 17, 2004

(30) Foreign Application Priority Data

Dec. 12, 2002 (DE) .......................................... 102 58 330

(51) Int. Cl.[7] .................................................. B60J 7/14
(52) U.S. Cl. .............. 296/108; 296/107.17; 296/107.18
(58) Field of Search ................... 296/108, 107.16–107.2

(56) References Cited

U.S. PATENT DOCUMENTS

| | | | | |
|---|---|---|---|---|
| 6,419,296 B2 * | 7/2002 | Dintner et al. | ......... | 296/107.18 |
| 6,682,125 B2 * | 1/2004 | Guillez et al. | ......... | 296/107.18 |
| 6,688,670 B2 * | 2/2004 | Biecker et al. | ......... | 296/107.18 |
| 2004/0061355 A1 * | 4/2004 | Guillez et al. | ............... | 296/108 |

FOREIGN PATENT DOCUMENTS

| | | |
|---|---|---|
| DE | 197 14 106 C2 | 10/1998 |
| DE | 197 14 127 C2 | 10/1998 |

* cited by examiner

Primary Examiner—Dennis H. Pedder
(74) Attorney, Agent, or Firm—Nixon Peabody LLP; David S. Safran

(57) ABSTRACT

A lowerable motor vehicle roof with two rigid roof elements (4, 6) which are located in succession in the closed state. The first roof element (4) can be moved via a driving connecting rod mechanism (10), which is made as a double rocker and which engages the sides of the front roof element, to the rear into a stowed position which is lowered in the convertible top compartment (14). The rear roof element (6) is coupled to the front roof element (4) via a connecting rod (28) which is connected to the connecting rod mechanism (10) and is guided on it via a sliding guide (34, 32) such that the rear roof element (6), when the front roof element (4) is moved, first, travels into a position which overlaps it and is then entrained into the stowed position. The closing of the vehicle roof has the reverse sequence of motions.

18 Claims, 7 Drawing Sheets

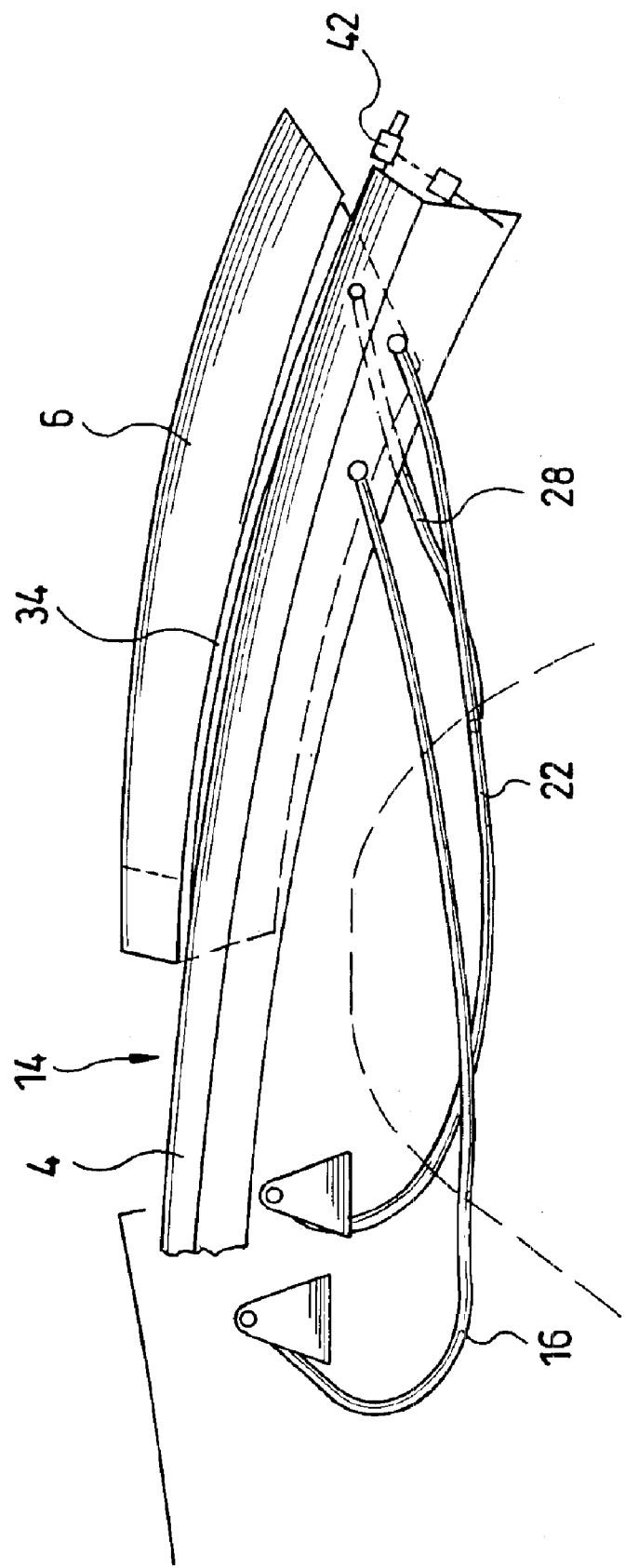

LOWERABLE MOTOR VEHICLE ROOF

BACKGROUND OF THE INVENTION

1. Field of the Invention

This invention relates to a lowerable motor vehicle roof of the type having front and rear rigid roof elements, of which the first roof element can be moved, by means of a driving connecting rod mechanism which is located on the sides of the roof, between a closed position and a stowed position which is lowered in a convertible top compartment the first roof element, on its path into the stowed position, arriving in a position which at least partially overlaps the second roof element and entrains the second roof element into the stowed position, Several structures are already known in which the two roof elements run in the lengthwise direction of the motor vehicle for opening the roof, and in doing so, are placed on top of one another and are stored jointly in a rear convertible top compartment, which is used at the same time as a trunk. For these motor vehicle roofs, generally, it is required that the connecting rod mechanism be as simple as possible, i.e., that it make do with as few hinges and drives as possible, and that the connecting rod mechanism be able to internest the roof elements in a space-saving manner, and then move them into a lowered position which requires as little stowage space as possible and which is optimally matched to the configuration of the convertible top compartment.

2. Description of Related Art

German Patent DE 197 14 106 C2 discloses a lowerable motor vehicle roof in which the two sides of the rear roof element are engaged by a first, driving connecting rod mechanism for moving the first roof element, in which the two sides of the front roof element are each engaged by a second, passive connecting rod mechanism for its guidance, and moreover, the front roof element is coupled to the rear roof element via another lever arrangement which engages the two sides. This arrangement meets the aforementioned requirements to the extent that the roof elements can be internested in a space-saving manner, the rear roof element with its concave side being pushed over the convex side of the front roof element, and that, then, the package composed of the front and the rear roof element can be stowed in the desired position in the trunk, which used as the convertible top compartment.

However, this known arrangement is extremely complex in terms of construction and operation since the driving connecting rod mechanisms alone each have six levers which are interconnected via seven hinges and are connected to the rear tail element, the passive connecting rod mechanisms have three levers each which are connected to one another via five hinges and to the front roof element, and the further lever arrangement has two levers which are connected via four hinges to the front and rear roof element, of which two are made as sliding hinges. Moreover, there is one actuating interlock for each driving connecting rod mechanism and for each passive connecting rod mechanism, and one actuating interlock for each of the sliding hinges.

Another disadvantage of the known arrangement is that, in it, the two levers of the further lever arrangement, in the internested position of the two roof elements, penetrate the roof skin of the front roof element so that the front roof element must be provided with the corresponding passage slots, with the generally recognized disadvantages with respect to their aesthetic design and rain-tight execution. A further disadvantage is also that the sequence of motion, for example, when opening the motor vehicle roof, proceeds relatively inharmonically since first the rear roof element is pushed in forward motion over the front roof element and then the two roof elements are lowered in the rear compartment jointly with a rearward motion.

German Patent DE 197 14 127 C2 discloses a lowerable motor vehicle roof in which the two sides of the rear roof element are engaged by a driving connecting rod mechanism for its displacement, and in which the front roof element is movable relative to the rear roof element via a driving connecting rod mechanism which engages the two sides of it. With regard to the connecting rod mechanism, this arrangement is simpler in terms of construction and operation than the arrangements according to German Patent DE 197 14 106 C2; but on each side of the roof, it has two driving connecting rod mechanisms, and accordingly, on each side of the roof, requires two displacement drives; this in turn increases structural and control engineering complexity.

Another disadvantage of this known construction is that its sequence of motion is relatively inharmonic, for example, when opening the motor vehicle roof since, first, the rear roof element is swung up, then, the front roof element is moved under the rear roof element, and then, the two roof elements are jointly swung down.

SUMMARY OF THE INVENTION

A primary object of this invention is to devise a lowerable motor vehicle roof of the type described above which is simpler in terms of construction and operation than the known, initially described constructions.

This object is achieved in accordance with the invention in that the connecting rod mechanisms each engage the first roof element which is remote from the convertible top compartment, that each connecting rod mechanism is made as a double rocker with two successive mechanism connecting rods which are coupled, on the one hand, to the vehicle body, and on the other hand, to the roof element, that each connecting rod mechanism comprises a connecting rod which is coupled, on one hand, to one of the mechanism connecting rods, and on the other, to the second roof element which is near the convertible top compartment, and that the first roof element and the second roof element are longitudinally movably guided relative to one another via a sliding guide.

The fact that the connecting rod mechanisms engage the roof element which is remote from the convertible top compartment and displaces it results in the motion of the first roof element automatically leading, via the position of the second roof element, towards the convertible top compartment so that, in contrast to the known structures which were described above, a harmonic motion sequence without the requirement of reversing the motion is possible. The first roof element first moving into the position which overlaps the second roof element and then the two roof elements being moved in the same direction of motion into the convertible top compartment. To close the motor vehicle roof, the sequence of motions takes place in the reverse direction, likewise in a continuous motion.

Double rockers represent a very simple displacement mechanism which can be designed by a suitable selection of the connecting rod geometry, i.e., the length of the mechanism connecting rod, the arrangement of the coupling points, etc., so that the first roof element is moved out of its generally horizontal closed position into a given lowered position which is matched to the respective geometry of the convertible top compartment and moved rearward.

The connecting rod, on the one hand, and the sliding guide for coupling the second roof element to the first roof element, on the other, likewise represent very simple mechanism elements. The connecting rod is designed essentially to entrain the second roof element in the displacement motion of the first roof element, the geometry of the connecting rod being chosen such that, in the motion of the first roof element out of its closed position into the lowered position, the second roof element is also moved in a superimposed motion out of its closed position into the lowered position, as is explained with reference to one embodiment. The sliding guide is designed essentially to guide the first roof element relative to the second roof element; it can likewise be designed simply such that, in the joint superimposed motion of the two roof elements into their lowered position, the first roof element is moved into a position which at least partially overlaps the second roof element, so that the two roof elements form a package which is as compact as possible and which is then lowered into the convertible top compartment, as is likewise explained with reference to one embodiment.

In one embodiment of the invention, it is provided that the body-side coupling points of the mechanism connecting rods are located underneath the vehicle roof plane and in the area between the closed position and the lowered position of the first roof element. In this arrangement of the body-side coupling point of the mechanism connecting rods, the first roof element, as it is moved out of the closed position into the lowered position (and back), is moved on an arc which is arched upward so that its transverse edge which is away from the convertible top compartment is separated without pinching from the assigned opposing edge of the adjoining fixed roof area. The second roof element, in the general case, is shifted by the connecting rod such that the first roof element, in the following phase of motion, can slide over or under the second roof element, its being guided by the sliding guide. In the first embodiment, it is provided that the first roof element and the second roof element assume a mutual position which is bent down and the first roof element is guided under the second roof element.

This relative adjustment of the two roof elements is achieved, for example, by the connecting rod being coupled in the middle area of the respective mechanism connecting rod, on the one hand, and in the area of the second roof element near the convertible top compartment, on the other. According to a preferred embodiment of the invention the connecting rod is coupled to the mechanism connecting rod which is near the second roof element and to the second roof element.

In order to prevent any adverse effect on certain side areas, for example, window surfaces of the motor vehicle, by the mechanism connecting rods, according to another embodiment of the invention, it is provided that the mechanism connecting rods are curved such that they keep certain, given side areas of the motor vehicle free when the motor vehicle roof is in the closed position.

The sliding guide according to one embodiment of the invention comprises at least one guide rail which runs lengthwise, which is located on one of the roof elements, and into which there a slider fits which is located in the area of the edge of the other roof element facing this roof element. In a preferred embodiment, the sliding guide comprises two guide rails which are located in the area of the side edges of the second roof element which is near the convertible top compartment, and into which an assigned slider which is located on the first roof element fits. Providing two sliding guides which are located in the area of the side edges ensures especially reliably guidance without tilting.

In order to ensure clear separation of the two facing contact edges of the two roof elements without pinching, in another embodiment of the invention, it is provided that the slider is displaceable essentially perpendicular to the plane of the assigned roof element between the inserted position in which the facing contact edges of the two roof elements lie in the same plane, and an extended position in which these contact edges are vertically offset relative to one another and can be locked in these positions. The displacement of the slider takes place via a separate drive that also produces locking of the slider in the two end positions.

In a preferred embodiment of the invention, the slider can be moved such that, in its extended position, the contact edge of the second roof element is above the contact edge of the first roof element, i.e., with movement into the lowered position, the first roof element is guided to under the second roof element.

The motor vehicle roof of the invention is intended, preferably, for passenger cars in which part of the trunk space which lies in the rear area of the motor vehicle is used as the convertible top compartment. In this case, the first roof element corresponds to the front roof element and the second roof element to the rear roof element. The invention is explained is explained in further detail below using the example of a motor vehicle roof for a passenger car.

Several embodiments of the invention are shown in the drawings and are explained in detail below.

BRIEF DESCRIPTION OF THE DRAWINGS

FIGS. 4 to 8 each show enlarged partial views of the motor vehicle roof shown in FIG. 3 in successive positions.

DETAILED DESCRIPTION OF THE INVENTION

Figure 3:
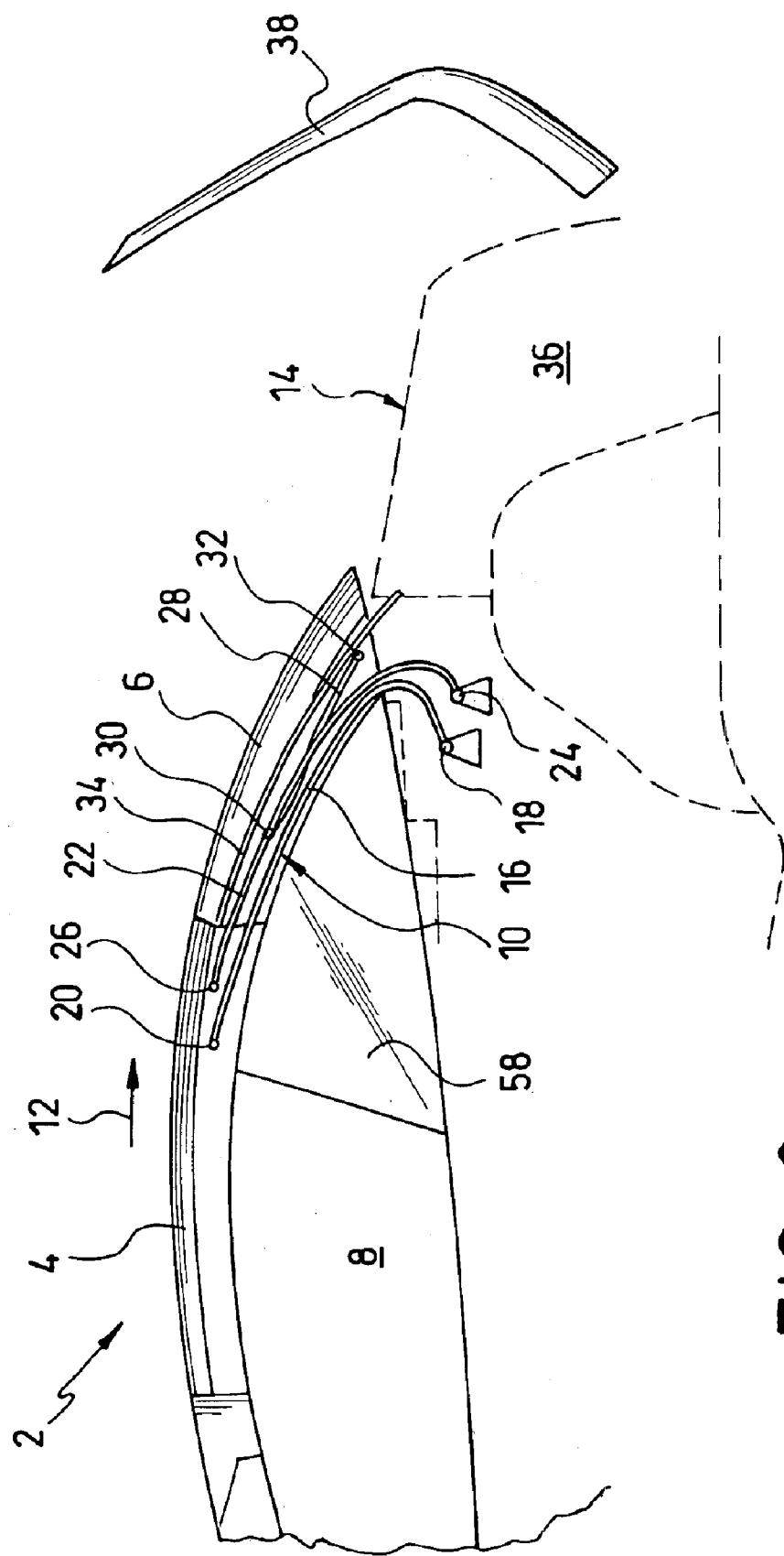
FIG. 3 is a partial side view of a motor vehicle with a first roof element, a second roof element and a connecting rod mechanism for lowering the motor vehicle roof into a convertible top compartment.

The configuration of a lowerable motor vehicle roof for passenger cars is best shown in FIG. 3. The motor vehicle roof 2 comprises a first roof element 4 which, in this case, is the front one, i.e., closer to the front of the vehicle, and a second, rear roof element 6. In the closed position shown in FIG. 3, the roof 2 covers the passenger compartment 8 of the motor vehicle. The roof element 4 can be moved out of the illustrated closed position, essentially in the direction of the arrow 12, to the rear by means of a connecting rod mechanism 10. The connecting rod mechanism 10 is made as a double rocker which engages the two lateral sides of the roof element, of which only the connecting rod mechanism facing the viewer is shown. By action of the connecting rod mechanism 10, the roof 2 can be lowered into a trunk space, part of which is used as the convertible top compartment 14.

The connecting rod mechanism 10 comprises a front mechanism connecting rod 16 with a body-side coupling point 18 and a roof-side coupling point 20, and a rear mechanism connecting rod 22 with a body-side coupling point 24 and a roof-side coupling point 26.

Furthermore, the connecting rod mechanism 10 comprises a connecting rod 28 which is connected at one end, via the coupling point 30, to the rear mechanism connecting rod 22, and at an opposite end, via the coupling point 32, to the rear roof element 6. Moreover, the front roof element 4 is coupled to the rear roof element 6 via a sliding guide to be able to move lengthwise relative to each other. The sliding guide comprises a guide rail 34 which is located on the rear roof element 6 and a slider which is guided in the guide rail 34, which is located on the front roof element 4 but which is not shown in FIG. 3 for the sake of simplicity.

By means of the connecting rod 28, the rear roof element 6 is pushed to the rear by the front roof element 4 when the latter is pushed to the rear such that the two roof elements first travel into a mutually overlapping position, and then, are deposited jointly in the convertible top compartment 14. By means of the sliding guide, the front roof element 4 is coupled to the rear roof element 6 such that when it is moved in the direction of the arrow 12 it is pushed into a position which is closely internested with the rear roof element 6. It goes without saying that to close the motor vehicle roof 2, the adjustment motion proceeds in the opposite direction.

One side wall 36 of the convertible top compartment 14 or of the trunk is labeled 36, and a trunk lid for closing the trunk or the convertible top compartment 14 is labeled 38.

The connecting rod mechanism 10 is moved via a drive which engages one of the mechanism connecting rods 16, 22 and which is not shown in FIG. 3.

Figure 1:
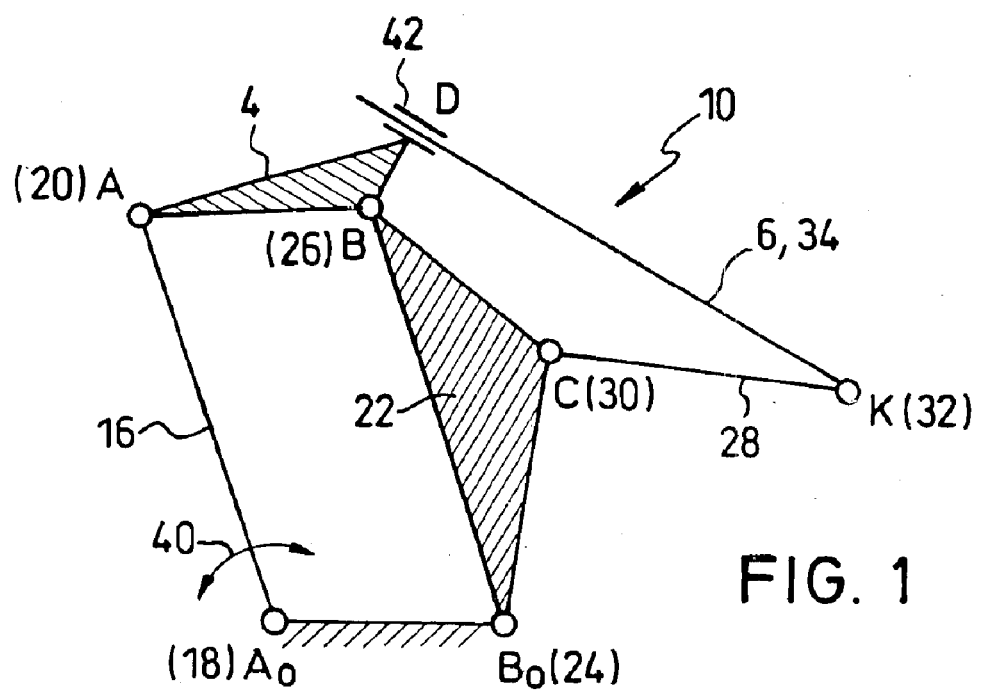
FIG. 1 schematically shows a six-member mechanism, comprising a first roof element, a second roof element and a connecting rod mechanism.

FIG. 1 shows, in highly schematic form, a vehicle roof arrangement that corresponds essentially to the arrangement as shown in FIG. 3. For better understanding in FIG. 1, the individual mechanism elements are labeled with the same reference numbers as used in FIG. 3. The front mechanism connecting rod 16 and the rear mechanism connecting rod 22 are coupled to the vehicle body at the respective coupling points 18, 24 and via the coupling points 20, 26 to the front roof element 4. Connecting rod 28 is connected, at the coupling point 30, to the rear mechanism connecting rod 22 and via the coupling point 32 to the rear roof element 6. The front roof element 4 is moreover guided via a slider 42 to be able to move lengthwise in a guide rail 34 which is made on the rear roof element 6.

The double rocker which is formed by the mechanism connecting rods 16, 22 can be swung into a position which corresponds to the deposited position of the front roof element, between the position which corresponds to the closed position of the front roof element 4, via a middle position which is shown in figure, in the direction of the double arrow 40 by means of a drive (not shown). In the swinging motion, the front roof element describes an arc which is arched upward so that the front roof element 4 is first raised up and to the rear during motion in the opening direction. The rear roof element 6 is moved to the rear via the connecting rod and travels into a position which is angled downward relative to the front roof element, as shown in FIG. 1. The rear edge of the front roof element 4 is then guided along the bottom of the rear roof element 36 so that the front roof element is pushed to under the rear roof element.

Figure 2:
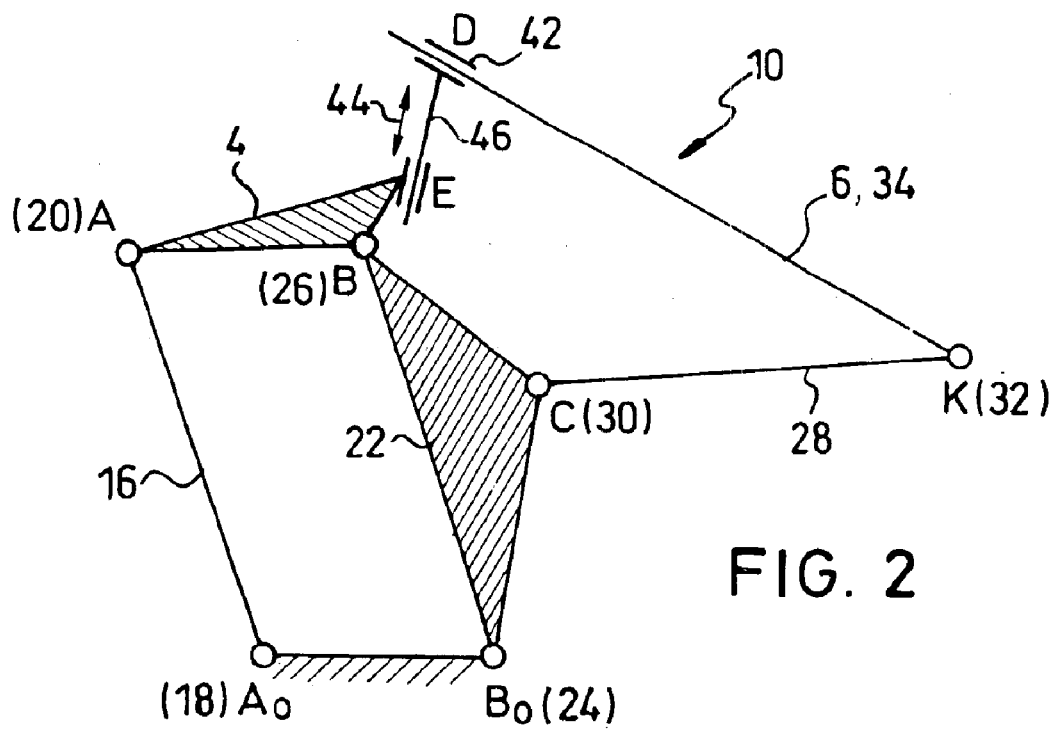
FIG. 2 schematically shows a seven-member mechanism, comprising a first roof element, a second roof element and a connecting rod mechanism.

FIG. 2 shows a modification of the arrangement that is shown in FIG. 1, the same parts being labeled with the same reference numbers. In contrast to the arrangement shown in FIG. 1, the slider 42 is located to be able to move relative to the front roof element 4 in the direction which is shown by the double arrow 44 and is essentially perpendicular to the plane of the roof. In order to separate the rear roof element 6 clearly from the front roof element 4 before opening the vehicle roof, the slider 42 is extended upward and the rear roof element 6 is raised before the double rocker formed by the mechanism connecting rods 16, 22 is swung in the opening direction. The segment D-E of variable length in FIG. 2 constitutes another connecting rod element 46.

Figure 4:
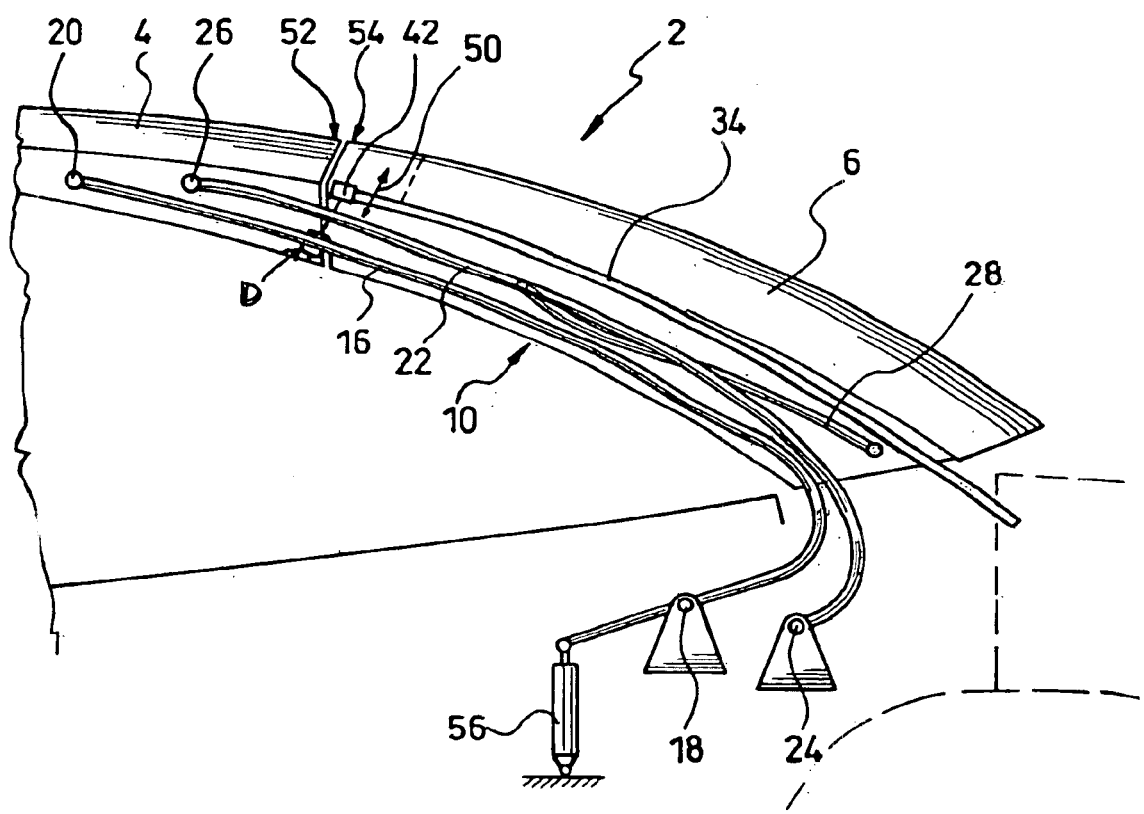
Figure 5:
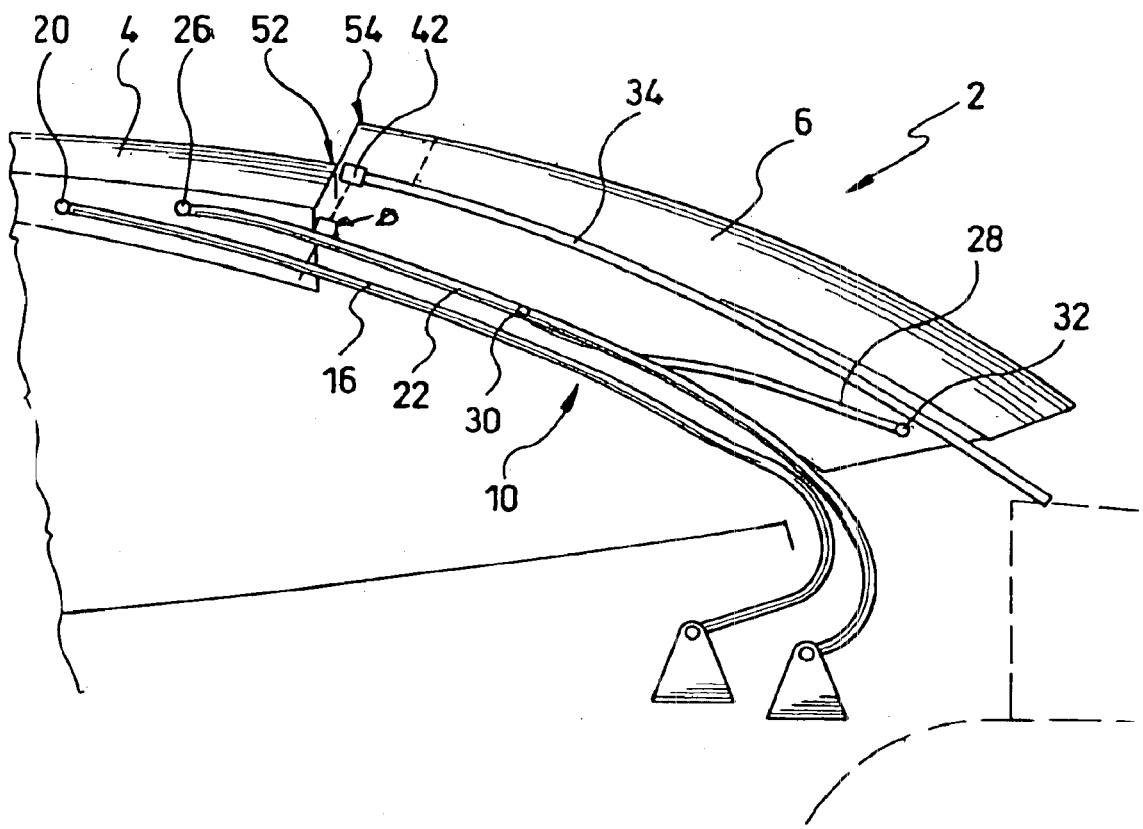

The embodiment which corresponds to FIG. 2 is shown in FIGS. 4 to 8 in different phases, components which correspond to those shown in FIGS. 1 to 3 are labeled with the same reference numbers. FIG. 4 shows an arrangement roughly corresponding to FIG. 3, the vehicle roof which formed of the front roof element 4 and the rear roof element 6 being in the closed state. The slider 42 which can be pushed in the guide rail 34 on the front roof element 4 in the direction of the double arrow 50, between the inserted position which is shown in FIG. 4 and in which the facing contact edges 52 54 of the front roof element 4 and of the rear roof element 6 are flush with one another, and the extended position that is shown in FIG. 5 and in which the contact edge 54 is raised relative to the contact edge 52.

Figure 6:
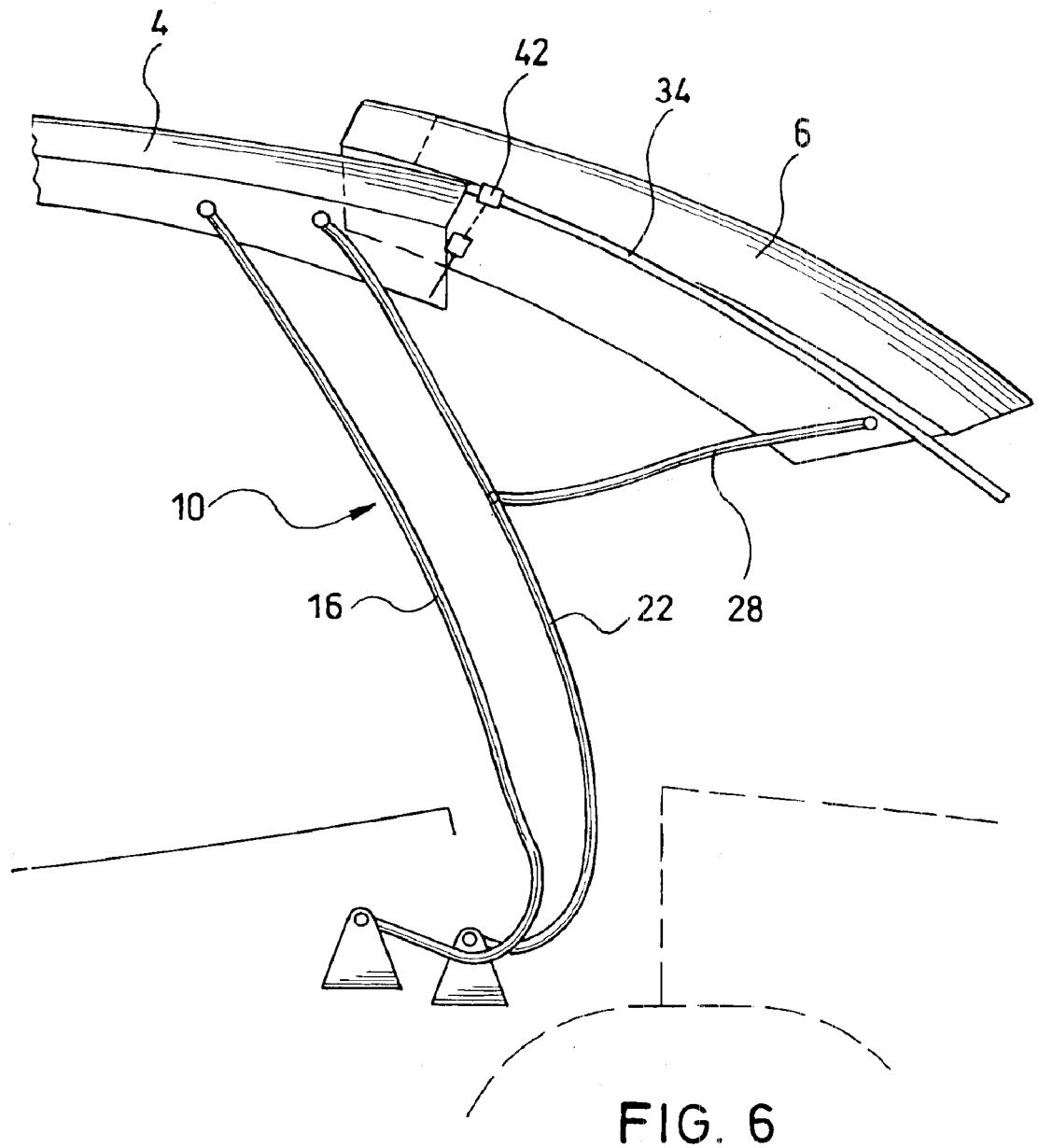
Figure 7:
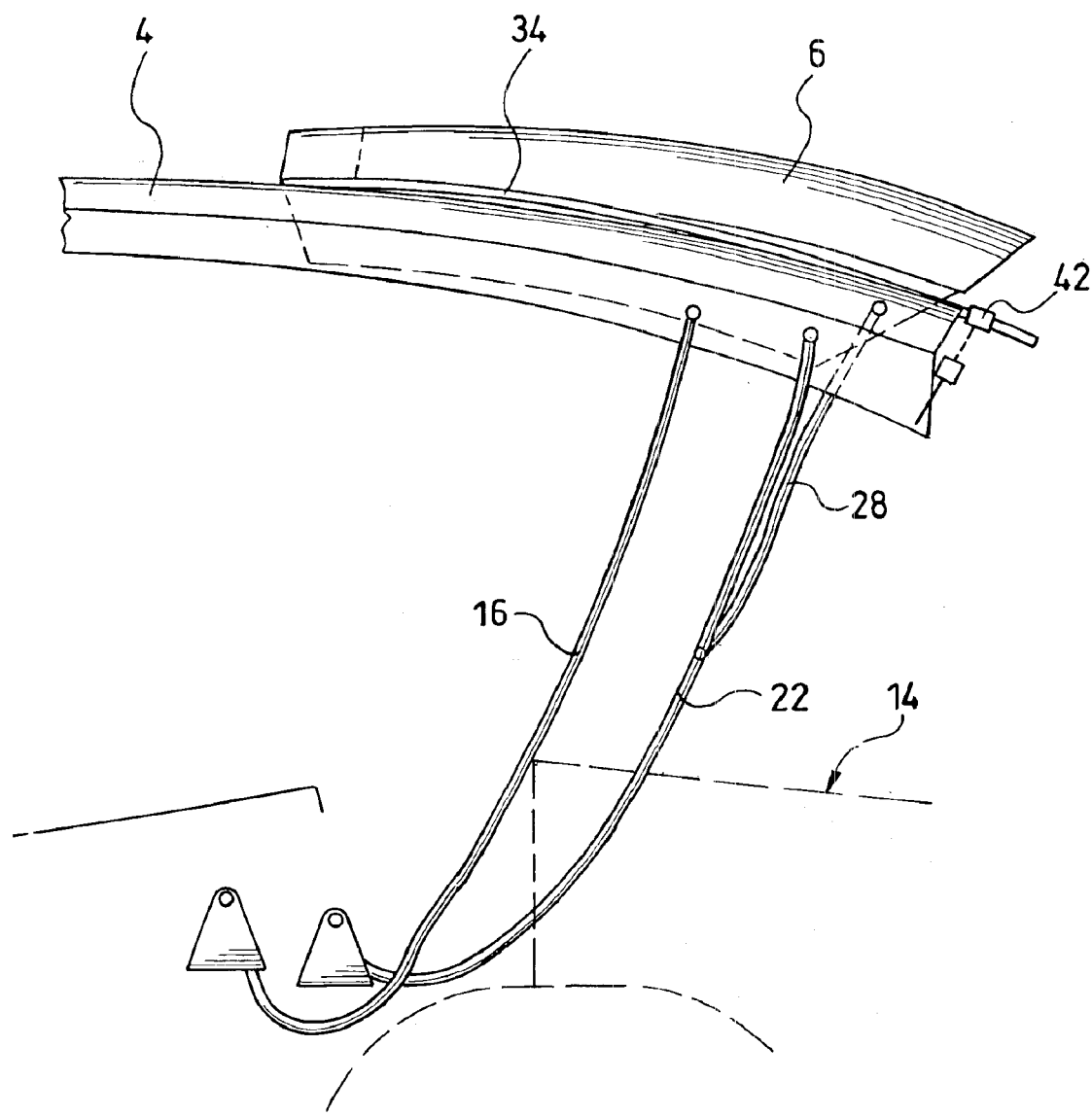

To open the vehicle roof 2, first, the slider 42 is moved into its extended position (FIG. 5) and the rear roof element 6 is raised. In doing so, the roof element 6 is guided by the connecting rod 28 in the rear area. The roof element 4 and the roof element 6 now have a mutual position in which the roof element 4 and the roof element 6 can be pushed. Then, the connecting rod mechanism 10 is swung to the rear by means of an actuator 56 which engages, for example, the front mechanism connecting rod 16, the front roof element 4 describing an arc to the rear and being pushed under the rear roof element 6, as shown by FIG. 6. FIG. 7 shows a position in which the front roof element 4 is in an overlapped relationship with respect to the rear roof element 6. In further swinging of the connecting rod mechanism 10 to the rear, the two roof elements are deposited together in the trunk 14, as shown by FIG. 8. In order to ensure clear separation of the two facing contact edges of the two roof elements without pinching, it is provided that the slider is displacable essentially perpendicular to the plane of the assigned roof element between the inserted position (FIG. 4) in which the facing contact edges of the two roof elements lie in the same plane, and the extended position (FIG. 5) in which these contact edges are vertically offset relative to one another and can be locked in these positions. The displacment of the slider takes place via a separate drive D that also produces locking of the slider in the two end positions.

It goes without saying that the sequence of motions of the connecting rod mechanism 10 and of the roof elements 4, 6 runs in the reverse manner when the vehicle roof is being closed.

It is pointed out that the motion of the front roof element 4 and of the rear roof element 6 proceeds continuously between the two end positions in a single direction, i.e., without reverse motion.

As is apparent especially from FIG. 3, the mechanism connecting rods 16, 22 are not straight, but are curved such that with the vehicle roof closed they keep the rear side windows 58 free.

What is claimed is:

1. Lowerable motor vehicle roof, comprising:
   a rigid front roof element,
   a rigid rear roof element,
   a driving connecting rod mechanism which is located on each lateral side of the roof, said driving connecting rod mechanism being connected to the front roof element for moving it between a closed position and a stowed position which is lowered in a convertible top compartment of a motor vehicle along a path which at least partially overlaps rear roof element and entrains the rear roof element into the stowed position, wherein the connecting rod mechanism, at each of said lateral sides, engages the front roof element, comprises a double rocker with two successive mechanism connecting rods which are couplable at one end to a vehicle body at body-side coupling points and an opposite end to the front roof element and comprises a connecting rod which is coupled at one end to one of the mechanism connecting rods and at a second end to the rear roof element, and wherein a sliding guide is provided for movably guiding the front roof element and the rear roof element in a lengthwise direction relative to one another.

2. Lowerable motor vehicle roof as claimed in claim 1, wherein the body-side coupling points of the mechanism connecting rods are located underneath a vehicle roof plane in an area between a closed position and a lowered position of the front roof element.

3. Lowerable motor vehicle roof as claimed in claim 1, wherein the connecting rod is coupled at one end to a middle area of the respective mechanism connecting rod and at an opposite end at an area of the second roof element located near the convertible top compartment.

4. Lowerable motor vehicle roof as claimed in claim 1, wherein the connecting rod is coupled to a one of the two successive mechanism connecting rods which is nearer to the rear roof element.

5. Lowerable motor vehicle roof as claimed in claim 1, wherein the mechanism connecting rods are curved so as to leave side window areas of the motor vehicle free when the motor vehicle roof is closed.

6. Lowerable motor vehicle roof as claimed in claim 1, wherein the sliding guide comprises at least one longitudinally extending guide rail which is located on one of the roof elements, and into which fits a slider which is located in an area of a contact edge of the other of the roof elements.

7. Lowerable motor vehicle roof as claimed in claim 6, wherein the at least one longitudinally extending guide rail comprises two guide rails which are located in an area of side edges of the rear roof element and into which a respective slider on the front roof element fits.

8. Lowerable motor vehicle roof as claimed in claim 6, wherein the slider is movable essentially perpendicular to a plane of the respective roof element between an inserted position in which facing contact edges of the two roof elements are flush with one another, and an extended position in which said contact edges are vertically offset relative to one another, the slider being lockable in said inserted and extended positions.

9. Lowerable motor vehicle roof as claimed in claim 8, wherein the contact edge of the rear roof element is above the contact edge of the front roof element in the extended position of the slider.

10. Motor vehicle with a lowerable roof, comprising:
a vehicle body having a convertible top compartment located in a rear area thereof,
a rigid front roof element,
a rigid rear roof element,
a driving connecting rod mechanism which is located on each lateral side of the roof, said driving connecting rod mechanism being connected to the front roof element for moving it between a closed position and a stowed position which is lowered in a convertible top compartment of a motor vehicle along a path which at least partially overlaps rear roof element and entrains the rear roof element into the stowed position, wherein the connecting rod mechanism, at each of said lateral sides, engages the front roof element, comprises a double rocker with two successive mechanism connecting rods which are coupled at one end to the vehicle body at body-side coupling points and an opposite end to the front roof element and comprises a connecting rod which is coupled at one end to one of the mechanism connecting rods and at a second end to the rear roof element, and wherein a sliding guide is provided for movably guiding the front roof element and the rear roof element in a lengthwise direction relative to one another.

11. Motor vehicle as claimed in claim 10, wherein the body-side coupling points of the mechanism connecting rods are located underneath a vehicle roof plane in an area between a closed position and a lowered position of the front roof element.

12. Motor vehicle as claimed in claim 10, wherein the connecting rod is coupled at one end to a middle area of the respective mechanism connecting rod and at an opposite end at an area of the second roof element located near the convertible top compartment.

13. Motor vehicle as claimed in claim 10, wherein the connecting rod is coupled to a one of the two successive mechanism connecting rods which is nearer to the rear roof element.

14. Motor vehicle as claimed in claim 10, wherein the mechanism connecting rods are curved so as to leave side window areas of the motor vehicle free when the motor vehicle roof is closed.

15. Motor vehicle as claimed in claim 10, wherein the sliding guide comprises at least one longitudinally extending guide rail which is located on one of the roof elements, and into which fits a slider which is located in an area of a contact edge of the other of the roof elements.

16. Motor vehicle as claimed in claim 15, wherein the at least one longitudinally extending guide rail comprises two guide rails which are located in an area of side edges of the rear roof element and into which a respective slider on the front roof element fits.

17. Motor vehicle as claimed in claim 15, wherein the slider is movable essentially perpendicular to a plane of the respective roof element between an inserted position in which facing contact edges of the two roof elements are flush with one another, and an extended position in which said contact edges are vertically offset relative to one another, the slider being lockable in said inserted and extended positions.

18. Motor vehicle as claimed in claim 17, wherein the contact edge of the rear roof element is above the contact edge of the front roof element in the extended position of the slider.

* * * * *